J. W. JONES.
WINDING DEVICE FOR SPRING MOTORS.
APPLICATION FILED JUNE 13, 1917.
1,257,286.
Patented Feb. 19, 1918.
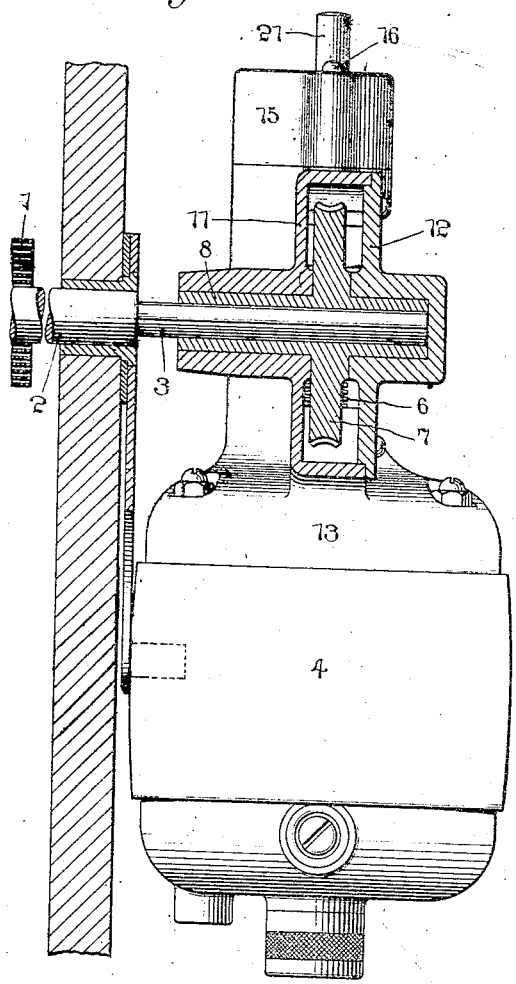
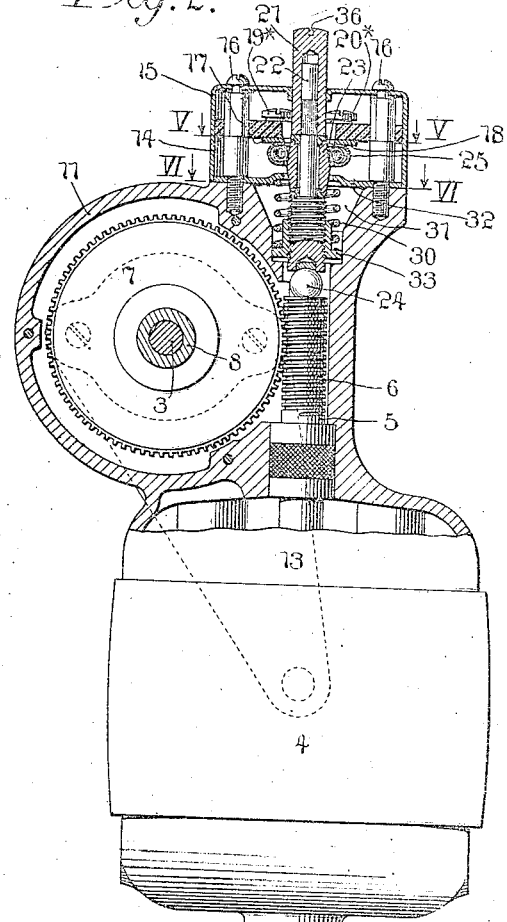

UNITED STATES PATENT OFFICE.

JOSEPH W. JONES, OF NEW YORK, N. Y., ASSIGNOR TO JONES MOTROLA, INC., OF NEW YORK, N. Y., A CORPORATION OF NEW YORK.

WINDING DEVICE FOR SPRING-MOTORS.

1,257,286.  Specification of Letters Patent.  Patented Feb. 19, 1918.

Application filed June 13, 1917. Serial No. 174,512.

*To all whom it may concern:*

Be it known that I, JOSEPH W. JONES, a citizen of the United States, and resident of the borough of Manhattan, in the city and State of New York, have invented a new and useful Improvement in Winding Devices for Spring-Motors, of which the following is a specification.

This invention is directed to means for maintaining a spring motor under operative tension at all times and includes a winding motor and means for connecting it to the spring motor whereby the operation of the winding motor is controlled by variations in tension of the spring motor spring due to the winding and unwinding thereof.

My invention more particularly includes means for adjusting the points at which the varying tension of the spring motor spring will cause the starting and stopping of the winding motor.

A practical embodiment of my invention is represented in the accompanying drawings, in which—

Figure 1 is a view of the winding device, shown partly in elevation and partly in section, Fig. 2 is a similar view taken at right angles to Fig. 1, the motor controlling switch being shown in its closed position, Fig. 3 is a detail section similar to Fig. 2, with the motor controlling switch shown in its open position, Fig. 4 is a detail section taken at right angles to Fig. 3, Fig. 5 is a transverse section taken in the plane of the line V—V of Fig. 2, and Fig. 6 is a transverse section taken in the plane of the line VI—VI of Fig. 2.

The winding device, to which my invention is shown as applied, is of the type shown, described and claimed in my U. S. Letters Patent No. 1,219,325, dated March 13, 1917, a general description of which device, sufficient to understand the operation of my present invention, will follow.

The spring motor spring is denoted by 1; its winding shaft by 2 and the extension shaft by 3. The winding motor 4, in the present instance an electric motor, has a longitudinally movable rotary armature shaft 5. This shaft has a winding connection with the spring motor spring through a worm 6 on the armature shaft and its worm gear 7 on a sleeve 8 surrounding the extension shaft 3 of the spring motor. The housing for the gears comprises the parts 11, 12 and 13.

The controlling switch for the electric motor comprises the plate 14 of insulating material and the shell 15 secured in position on the gear housing by the screws 16. Two circuit contact pieces 17, 18, are electrically connected to the circuit wires 19, 20, of the electric motor, by the screws 19*, 20*, which also serve to secure the contact pieces to the under side of the plate 14; the ends of said contact pieces being turned upwardly, as shown at 17*, 18*, into the body of the plate to prevent the pieces from turning. The longitudinally movable plunger of the switch comprises the members 21, 22 and 23, arranged in alinement with the armature shaft 5 for anti-friction purposes.

A ball 24 is interposed between the adjacent ends of the armature shaft and switch plunger. The member 23 of the plunger is provided with oppositely tapered portions surrounded by a yielding contact ring 25 arranged to be snapped into and out of engagement with the contact pieces 17 and 18 to close and open the circuit for starting and stopping the winding motor as the plunger nears the limits of its inward and outward movements, respectively.

The upper member 21 of the plunger is frictionally locked to the lower member 22 and projects upwardly out of the shell 15 to serve as a manual means for moving the plunger inwardly to close the circuit for starting the winding motor, at pleasure. The tendency of the spring motor spring to unwind exerts an endwise pressure on the armature shaft 5 through the worm gear 7 and worm 6 tending to move the armature shaft longitudinally in a direction to open the switch through the medium of the members 21, 22, 23, which pressure varies as the resistance of the spring motor spring varies.

The automatic means provided for starting the winding motor when the spring motor spring reaches a predetermined low resistance, comprises a coil spring 30 seated in the recess 31 of the gear housing between a plate 32 at the top of the recess and the flange of a traveling nut 33 having a screw-threaded engagement with the member 22 of the switch plunger. This nut is held against rotary movement by providing it with ears 34 sliding in slots 35 in the walls of the recess 31.

The tension of the spring 30 may be accurately adjusted to any desired degree by turning the switch plunger in either direction. This may be conveniently done by providing the top of the member 21 of the plunger with a kerf 36 for the reception of a screw driver or other suitable tool. The tension of this spring 30 is made so that it will overcome the pressure exerted by the resistance of the spring motor spring when the said spring motor spring tension is reduced to a predetermined degree by the unwinding thereof, and will, in turn, be overcome by the pressure exerted by the increased resistance of the spring motor spring when the spring motor spring has been wound to a predetermined degree.

The operation of the device is as follows: Assuming the spring motor spring has been unwound to a predetermined low tension and that the switch has been closed by the pressure exerted by the spring 30 and the armature shaft 5 moved endwise to the limit of its movement in one direction, the rotary movement of the armature shaft due to the operation of the electric winding motor, will wind the spring motor spring through the gear up to a point where the endwise pressure on the armature shaft due to the increased tension of the spring motor spring, will move the armature shaft endwise against the pressure exerted by the spring 30 into position to open the switch. This will automatically cause the electric winding motor to stop and thereby cease winding the spring motor spring. When the spring motor spring has been unwound to a predetermined point where its endwise pressure on the armature shaft is less than the pressure of the spring 30, the spring 30 will move the plunger and thereby the armature shaft endwise in the opposite direction and thereby close the switch to again start the winding motor.

It will be seen that these predetermined points of starting and stopping the winding motor may be accurately adjusted to suit spring motor springs of various characters and to suit different requirements. This adjustment can be very easily obtained by turning the exposed end of the switch plunger in one direction or the other.

It will also be seen that this adjustment is carried by the manual means for starting the winding motor at any time irrespective of the tension of the spring motor spring, said manual means not interfering in any respect with the automatic operation of the device.

It is evident that the particular means which I have shown for adjusting the tension of the spring 30 is only one of many different forms; hence I do not wish to limit myself strictly to this particular means, but wish to cover all equivalent means for producing this result.

What I claim is:

1. A winding device for spring motors including a winding motor, means for connecting it to the spring motor comprising a movable element whose movement is controlled by the varying resistance of the spring motor spring for starting and stopping the winding motor and adjustable automatically operating means to return the movable element to its original position.

2. A winding device for spring motors including a winding motor, means for connecting it to the spring motor comprising a movable element whose movement is controlled by the varying resistance of the spring motor spring for starting and stopping the winding motor and both manual and adjustable automatically operating means to return the movable element to its original position.

3. A winding device for spring motors including a switch, an electric winding motor, means for connecting it to the spring motor comprising a movable element whose movement is controlled by the varying resistance of the spring motor spring to close and open the switch for starting and stopping the electric winding motor and adjustable automatically operating means to return the movable element to its original position.

4. A winding device for spring motors including a switch, an electric winding motor, means for connecting it to the spring motor comprising a movable element whose movement is controlled by the varying resistance of the spring motor spring to close and open the switch for starting and stopping the electric winding motor and both manual and adjustable automatically operating means to return the movable element to its original position.

5. A winding device for spring motors including a winding motor, means for connecting it to the spring motor comprising a movable element which is moved by the resistance of the spring motor spring to stop the winding motor and adjustable automatically operating means to move said element to start the winding motor.

6. A winding device for spring motors including a winding motor, means for connecting it to the spring motor comprising a movable element which is moved by the resistance of the spring motor spring to stop the winding motor and both manual and adjustable automatically operating means to move said element to start the winding motor.

7. A winding device for spring motors including a switch, an electric winding motor, means for connecting it to the spring motor, said switch being opened by the resistance of the spring motor spring to stop the electric winding motor and adjustable automatically operating means to close said switch to start the electric winding motor.

8. A winding device for spring motors including a switch, an electric winding motor, means for connecting it to the spring motor, said switch being opened by the resistance of the spring motor spring to stop the electric winding motor and both manual and adjustable automatically operating means to close said switch to start the electric winding motor.

9. A winding device for spring motors including a switch, an electric motor, means for connecting it to the spring motor, said switch being opened by the increased resistance of the spring motor spring to a predetermined degree to stop the electric motor and adjustable automatically operating means to close said switch to start the electric motor when the tension of the spring motor spring has been reduced to a predetermined degree.

10. A winding device for spring motors including a switch, an electric winding motor, means for connecting it to the spring motor, the spring motor spring serving as a pressure means to open the switch to stop the electric winding motor and adjustable automatic means to close the switch to start the electric winding motor, the movement of the switch being accomplished by an overbalancing in pressure due to the varying tension of the spring motor spring.

11. A winding device for spring motors including a winding motor, means connecting it to the spring motor including a rotary shaft movable endwise in one direction by the increased resistance of the spring motor spring to stop the winding motor and adjustable automatic means for moving the shaft in the opposite direction to start the winding motor when the spring motor spring resistance is reduced to a predetermined degree.

12. A winding device for spring motors including a winding motor, means connecting it to the spring motor including a rotary shaft movable endwise in one direction by the increased resistance of the spring motor spring to stop the winding motor, adjustable automatic means for moving the shaft in the opposite direction to start the winding motor when the spring motor spring resistance is reduced to a predetermined degree, and manual means to start the winding motor at pleasure.

13. A winding device for spring motors including a switch, an electric winding motor, means connecting it to the spring motor including a rotary shaft movable endwise in one direction by the increased resistance of the spring motor spring to open the switch to stop the winding motor and adjustable automatic means to close the switch and move the shaft in the opposite direction to start the winding motor when the spring motor spring resistance is reduced to a predetermined degree.

14. A winding device for spring motors including a switch, an electric winding motor, means connecting it to the spring motor including a rotary shaft movable endwise in one direction by the increased resistance of the spring motor spring to open the switch to stop the winding motor, adjustable automatic means to close the switch and move the shaft in the opposite direction to start the winding motor when the spring motor spring resistance is reduced to a predetermined degree, and manual means to start the winding motor at pleasure.

15. A winding device for spring motors including a winding motor, means connecting it to the spring motor including a rotary shaft movable endwise in one direction by the increased resistance of the spring motor spring to stop the winding motor, automatic means for moving the shaft in the opposite direction to start the winding motor when the spring motor spring resistance is reduced to a predetermined degree, manual means to start the winding motor at pleasure, and means carried by the manual means for adjusting the automatic means.

16. A winding device for spring motors including a switch, an electric motor, means for connecting it to the spring motor comprising the longitudinally movable rotary armature shaft whose movement in one direction is accomplished by an increase in pressure thereon due to an increased tension of the spring motor spring to open the switch for stopping the electric motor and adjustable automatic means for moving the armature shaft in the opposite direction when the tension of the spring motor spring is reduced to close the switch for starting the electric motor.

17. A winding device for spring motors including a switch, an electric motor, means for connecting it to the spring motor comprising the longitudinally movable rotary armature shaft whose movement in one direction is accomplished by an increase in pressure thereon due to an increased tension of the spring motor spring to open the switch for stopping the electric motor and adjustable automatic means for moving the armature shaft in the opposite direction when the tension of the spring motor spring is reduced to close the switch for starting the electric motor, and manual means for closing the switch to start the electric motor.

18. A winding device for spring motors including a switch, an electric motor, means for connecting it to the spring motor comprising the longitudinally movable rotary armature shaft, said spring motor spring serving as a means to move the shaft in one direction for opening the switch to stop the electric motor and adjustable automatic means to move the shaft in the other direction and close the switch to start the electric motor, the movement of the shaft being accomplished by an overbalancing in pressure due to the varying tension of the spring motor spring.

19. A winding device for spring motors including a switch, an electric motor, means for connecting it to the spring motor comprising the longitudinally movable rotary armature shaft, said spring motor spring serving as a means to move the shaft in one direction for opening the switch to stop the electric motor and adjustable automatic means to move the shaft in the other direction and close the switch to start the electric motor, the movement of the shaft being accomplished by an overbalancing in pressure due to the varying tension of the spring motor spring, and manual means for closing the switch to start the motor.

In testimony, that I claim the foregoing as my invention, I have signed my name this 15th day of May, 1917.

JOSEPH W. JONES.